Figure 1:
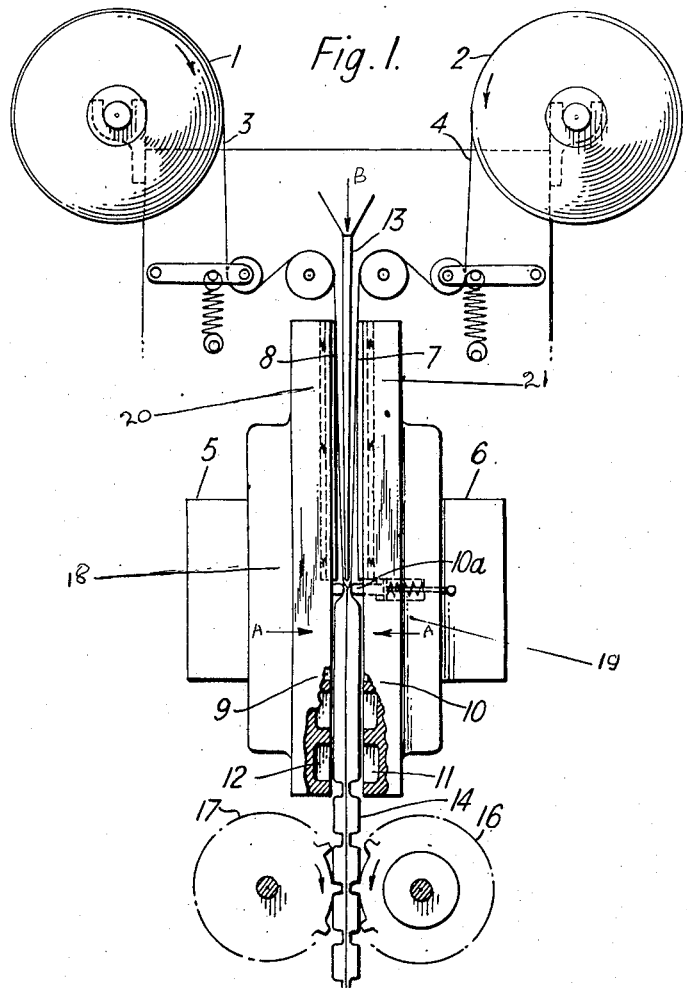

Dec. 29, 1959   L. RADO   2,918,768
METHOD AND MEANS FOR THE PRODUCTION OF
LIQUID OR PASTE FILLED CONTAINERS
Filed Nov. 14, 1955

United States Patent Office 2,918,768
Patented Dec. 29, 1959

2,918,768
METHOD AND MEANS FOR THE PRODUCTION OF LIQUID OR PASTE FILLED CONTAINERS

Leopold Rado, deceased, late of London, England, by Dorothy Frances Pickering, executrix, North Kensington, London, England Application November 14, 1955, Serial No. 546,410

Claims priority, application Great Britain November 16, 1954

7 Claims. (Cl. 53—178)

The invention relates to a method and means for the production of liquid or paste filled containers from two heat weldable strips.

A process has already been suggested for the production of paste-filled containers made of thermoplastic sheets or non-thermoplastic sheets coated with thermoplastic substances or laminated to thermoplastic materials, wherein firstly a large container is produced which is filled with the pasty substance to be packed and thereafter the contents of the filled container are evenly distributed throughout in equal thickness and lastly the container is brought between a pair of forming tools having shaped cavities and by pressure the walls of the container surrounding the cavities are brought into contact with each other and heat is applied to the pressure places to weld the contacting walls together whereby a number of containers are produced which are thereafter separated from each other.

Furthermore it is known to use high frequency electric currents to effect heat welding of contacting walls of a heat sealable liquid or paste filled container on the formation thereof, the necessary heat for the welding being applied after the liquid or paste content of the container has been displaced from the region to be heat welded by mechanical pressure of heat welding tools.

It is an object of the invention to provide an improved method for the production of liquid or paste filled containers, and an apparatus for performing the method.

The invention consists of a method for the production of liquid or paste filled containers from two heat weldable strips, comprising the steps of bringing a longitudinal portion of each strip into overlying relation one with the other, sealing transversely overlying ends of the strip portions together and sealing the overlying edges of the strip portions together to form a primary container, filling at least part of the container with liquid or paste, applying pressure to the walls of the primary container at the filled part thereof to form a plurality of filled smaller containers from the filled part of said primary container, heat welding the strip portions together around each of the said smaller containers and, substantially simultaneously therewith, bringing a next longitudinal portion of each strip into overlying relation one with the other, and sealing the overlying edges of the next strip portions together to form a next primary container for obtaining therefrom a next plurality of filled smaller containers whereby a primary container and a plurality of smaller containers are substantially simultaneously formed.

Prior to the step of applying pressure to the walls of the primary container, the strip portions may be sealed transversely at a region a predetermined distance from the overlying ends, whereby to retain liquid or paste between the said region and the said ends, all of the liquid or paste so retained being forced in the subsequent pressing step into the smaller containers during their formation. The respective regions of the strip portions to be sealed may be heat welded together.

The heat welding steps may be effected by the use of high frequency electric currents.

The invention also consists in an apparatus for performing the above described method, the apparatus comprising means for continually bringing longitudinal portions of two strips into overlying relation one with the other, means for sealing transversely overlying ends of the strip portion together, means for sealing the overlying edges of the strip portions together to form a primary container, means for filling at least part of the container with the liquid or paste, forming tools for applying pressure to the walls of the primary container at the filled part thereof to form a plurality of filled smaller containers from the primary container, and means for heat welding the strip portion together around each of the said smaller containers, the last mentioned means being operative substantially simultaneously with the means for sealing the overlying edges of the next strip portion together whereby at each cycle of operation a next primary container is formed while the preceding smaller containers are formed.

Means may be provided for sealing the strip portions transversely at a region a predetermined distance from the said overlying ends prior to the application of the forming tools whereby to retain at least a part of the liquid or paste between the said region and the said ends, the forming tools being applied to the primary container between the said region and the said overlying ends.

The means for heat welding the walls of the primary container to form the plurality of smaller containers may be part of the forming tools, the forming tools together with the means for sealing the overlying edges of the next strip portions together being in the form of combined pressing and sealing tools, of which one section produces the plurality of smaller containers and other section simultaneously therewith seals together the overlying edges of the next strip portion.

The means for sealing the strip portions transversely at a region a predetermined distance from the overlying ends may be provided on the combined pressing and sealing tools, and arranged for sealing the strip portions prior to the forming tools becoming fully effective.

Preferably the combined pressing and sealing tools when in their inoperative positions are arranged at a predetermined distance from each other to form a passage for the primary containers between them, the arrangement being such that on filling the primary container or part thereof the pressing and sealing tools determine the amount of liquid or paste in the primary container or its part by limiting outward movement of the container walls on filling the container.

Preferably the forming and sealing tools are such that on each operation a greater length of the overlying edges are sealed together than is to be utilised in one operation of the said tool for the formation of the plurality of smaller containers.

All or any of the sealing means may be heat welding means. All heat welding means may be electric high frequency welding means.

Figure 2:
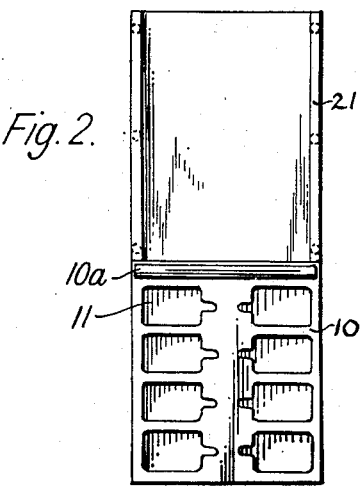

In order to make the invention clearly understood reference will now be made to the accompanying drawings which are given by way of example and in which:

Figure 1 is an elevational view, partly in section, of an apparatus for performing the method of the invention; and Figure 2 is a side elevational view of one of the combined pressing and welding tools of the apparatus of Figure 1.

In the drawings, two rolls 1 and 2 are shown, from which thermoplastic strips 3 and 4 can be drawn, the strips 3 and 4 passing between two combined forming and welding tools 18 and 19 movable towards and away from one another by pressing means 5 and 6. The forming and welding tools 18, 19, comprise lower forming and welding parts 9 and 10 and upper edge welding parts 20 and 21, the lower parts 9 and 10 being provided with cavities 11 and 12 and the upper parts 20 and 21 being provided with spring mounted electric high frequency edge welding electrodes 7 and 8.

A spring loaded presser bar 10a is provided transversely on one, 19, of the forming and welding tools above the lower part 10 of the said one tool 19. A filler tube 13 extends into and between the upper parts 20 and 21 of the forming and welding tools. Rotatable transport rollers 16 and 17 are operable by a suitable drive.

The apparatus is operated in the following manner:

A portion of the strip 3 from the roll 1 and a portion of the strip 4 from the roll 2 are together fed between the upper parts 20 and 21 of the forming and welding tools 18 and 19, the tools 18 and 19 are moved towards each other in the direction of the arrows A—A by the pressing means 5 and 6, and the overlying ends and edges of the said strip portions are heat welded together by the effect of high frequency electric currents applied to the forming and welding tools, to form a primary container. The forming and welding tools 18, 19 are withdrawn from each other and the primary container is partly filled by means of the filler tube 13 with a liquid or paste to be packed, the liquid or paste entering the filler tube 13 in the direction of the arrow B. The primary container so filled is thereupon fed downwards so as to come between the lower parts 9 and 10 of the forming and welding tools 18 and 19, a next portion of each strip 3 and 4 drawn from the rolls 1 and 2 respectively being brought at the same time between the upper parts 20 and 21 of the forming and welding tools. The forming and welding tools 18 and 19 are again brought together by movement in the directions of the arrows A—A, the spring loaded presser bar 10a transversely sealing by its pressure the primary container at a point somewhat below the level of the liquid or paste in the primary container prior to the lower parts 9 and 10 of the forming and welding tools 18 and 19 becoming fully operative by being moved fully together. On continuation of the movement of the forming and welding tools towards each other, the applied pressure causes the formation of a plurality of smaller containers, the shape of each smaller container being defined by the cavities 11 and 12, the liquid or paste contained within the primary container being forced by the applied pressure into the smaller containers during their formation. Thereupon the strips 3 and 4 are heat welded together around the smaller containers by the effect of high frequency electric currents applied to the forming and welding tools 18 and 19 and at the same time the upper parts 20 and 21 of the forming and welding tools serve simultaneously to heat weld the overlying edges of a next portion of each strip 3 and 4 together, and thereby form a next primary container. The forming and welding tools are now withdrawn from each other, the said next primary container is partly filled by means of the filler tube 13, and the said next primary container is fed downwards so as to cause the filled part thereof to come between the lower parts 9 and 10 of the forming and welding tools, ready for the next formation of a further plurality of smaller containers, the smaller containers 14 formed during the previous operations being removed from the region of the forming and welding tools by the rotating transport rollers 16, 17.

It is advantageous in operation of the apparatus that on each operation of the forming and welding tools 18 and 19 a greater length of the overlying edges of the strips 3 and 4 be heat welded together than is to be utilised in one operation of the forming and welding tools 18 and 19 for the formation of the plurality of smaller containers, since by operation of the presser bar 10a some of the liquid or paste remains above the pressure bar 10a during the formation of the smaller container.

Modifications are possible, for example, the pressure bar 10a instead of sealing by pressure, may be arranged to cause a heat welding by the effect of high frequency electric currents.

The overlying edges of the strips 3 and 4 may instead of being heat welded, be simply held sealed by mechanical pressure during the operation of the apparatus.

The heat weldable strips 3 and 4 may be made of vinyl resin, for example plasticised or non-plasticised polyvinyl chloride. Instead of using high frequency heat welding, the heat welding may be effected by, for example electrically heated tools.

What is claimed is:

1. An apparatus for producing a plurality of small containers, filled with a flowable material, comprising means for bringing longitudinal portions of two strips into overlying relation one with the other, two cooperating sealing tools each sealing tool having two parts, means arranged in one of the said parts of each tool for sealing transversely overlying ends of the strip portions together, means provided in the same one part of each tool for sealing the overlying edges of the strip portions together to form a primary container, means for filling at least part of the container with the flowable material, means for transferring the said primary container from the said one part of each sealing tool to the said other part of each sealing tool, said sealing tools being arranged for applying pressure to the walls of the primary container at the filled part thereof, to limit positively the amount of flowable material in the primary container, small container forming tools in the other part of each sealing tool, means for moving the forming tools towards each other for increasing pressure on the walls of the primary container at the filled part thereof to form a plurality of filled small containers from the said filled part of the primary container, said small container forming tools including means for heat welding the strip portions together around each of said small containers, the forming tool moving means being operative substantially simultaneously with said means for sealing the overlying edges of the strip portions together, whereby at each cycle of operation a next primary container is formed while the preceding small containers are sealed.

2. An apparatus claimed in claim 1, wherein said means for sealing transversely the overlying ends of the strip portions transversely seal the next strip portions together at a region a predetermined distance from the said overlying ends prior to the application of the small container forming tools, whereby to retain at least a part of the liquid or paste between the said region and the said ends, the small container forming tools being applied to the primary container between the said region and the said overlying ends.

3. An apparatus as claimed in claim 1, wherein the small container forming tools, together with the means for sealing the overlying edges of the next strip portions together are in the form of combined pressing and sealing tools, of which one section produces the plurality of small containers and the other section simultaneously therewith seals together the overlying edges of the next strip portions.

4. An arrangement as claimed in claim 3, wherein the means for sealing transversely the overlying ends of the strip portions transversely seal the next strip portions together at a region a predetermined distance from the overlying ends and are provided on the combined pressing and sealing tools, and are arranged for sealing the strip portions prior to the small container forming tools becoming fully effective.

5. An apparatus as claimed in claim 3 wherein the combined pressing and sealing tools, when in their inoperative positions, are arranged at a predetermined distance from each other to form a passage for the primary containers between them, the arrangement being such that on filling the primary container or a part thereof the pressing and sealing tools determine the amount of liquid or paste in the primary container or its part by limiting outward movement of the container walls on filling the container.

6. An apparatus as claimed in claim 1 wherein the two parts of the sealing tools are such that on each operation a greater length of the overlying edges are sealed together than is to be utilised in one operation of the said tools for the formation of the plurality of small containers.

7. An apparatus as claimed in claim 1 wherein the heat welding means are electric high frequency heat welding means.

References Cited in the file of this patent

UNITED STATES PATENTS

| | | |
|---|---|---|
| 2,388,824 | Brown | Nov. 13, 1945 |
| 2,566,533 | Poux | Sept. 1, 1951 |
| 2,606,412 | Salfisberg | Aug. 12, 1952 |

FOREIGN PATENTS

| | | |
|---|---|---|
| 144,108 | Australia | Nov. 6, 1951 |